(12) United States Patent
Grossinger et al.

(10) Patent No.: US 10,019,843 B2
(45) Date of Patent: Jul. 10, 2018

(54) CONTROLLING A NEAR EYE DISPLAY

(71) Applicant: Facebook, Inc., Menlo Park, CA (US)

(72) Inventors: Nadav Grossinger, Karmei Yosef (IL); Yair Alpem, Kfar Saba (IL)

(73) Assignee: Facebook, Inc., Menlo Park, CA (US)

( * ) Notice: Subject to any disclaimer, the term of this patent is extended or adjusted under 35 U.S.C. 154(b) by 142 days.

(21) Appl. No.: 14/453,733

(22) Filed: Aug. 7, 2014

(65) Prior Publication Data

US 2015/0042680 A1 Feb. 12, 2015

Related U.S. Application Data

(60) Provisional application No. 61/863,510, filed on Aug. 8, 2013.

(51) Int. Cl.
*G06T 19/00* (2011.01)
*G09G 3/34* (2006.01)
*G06F 1/16* (2006.01)
*G06F 3/01* (2006.01)
*G06F 3/03* (2006.01)

(52) U.S. Cl.
CPC ............ *G06T 19/006* (2013.01); *G06F 1/163* (2013.01); *G06F 3/011* (2013.01); *G06F 3/017* (2013.01); *G06F 3/0304* (2013.01)

(58) Field of Classification Search
CPC .......... G02B 2027/0178; G02B 27/017; G02B 2027/0134; G06F 3/017; G06F 3/0426
USPC ......................................................... 345/633
See application file for complete search history.

(56) References Cited

U.S. PATENT DOCUMENTS

| 2012/0235906 | A1* | 9/2012 | Ryoo | G06F 3/017 345/158 |
| 2013/0016070 | A1* | 1/2013 | Starner | G02B 27/017 345/175 |
| 2013/0229396 | A1* | 9/2013 | Huebner | H04N 9/3147 345/207 |
| 2013/0229499 | A1* | 9/2013 | Zhao | G06F 3/0482 348/51 |
| 2013/0335302 | A1* | 12/2013 | Crane | H04N 5/2354 345/8 |
| 2014/0198017 | A1* | 7/2014 | Lamb | G06F 3/012 345/8 |

(Continued)

FOREIGN PATENT DOCUMENTS

CN 104345802 A 2/2015
WO WO 2013/088442 A1 6/2013

*Primary Examiner* — Yuehan Wang
(74) *Attorney, Agent, or Firm* — Fenwick & West LLP

(57) ABSTRACT

A method and a system for controlling a near eye display using a virtual navigation space are provided herein. The system may include: a wearable near eye display; a sensor having a field of view, attached to the wearable near eye display and configured to capture a scene; a transmitter attached to the wearable near eye display said transmitter is configured to transmit a structured light pattern onto a navigation space, wherein the sensor is configured to capture reflections of the specified pattern coming from the navigation space; and a computer processor configured to analyze said reflections and control a visual indicator presented to a user over the wearable near eye display. The method implements the aforementioned logic without being limited to the architecture.

26 Claims, 5 Drawing Sheets

(56) References Cited

U.S. PATENT DOCUMENTS

2014/0306889 A1* 10/2014 Kresl .................. G06F 3/033
 345/157
2015/0095953 A1* 4/2015 Cheon ............... H04N 21/4828
 725/53
2016/0370592 A1* 12/2016 Mak ..................... G02B 27/00

* cited by examiner

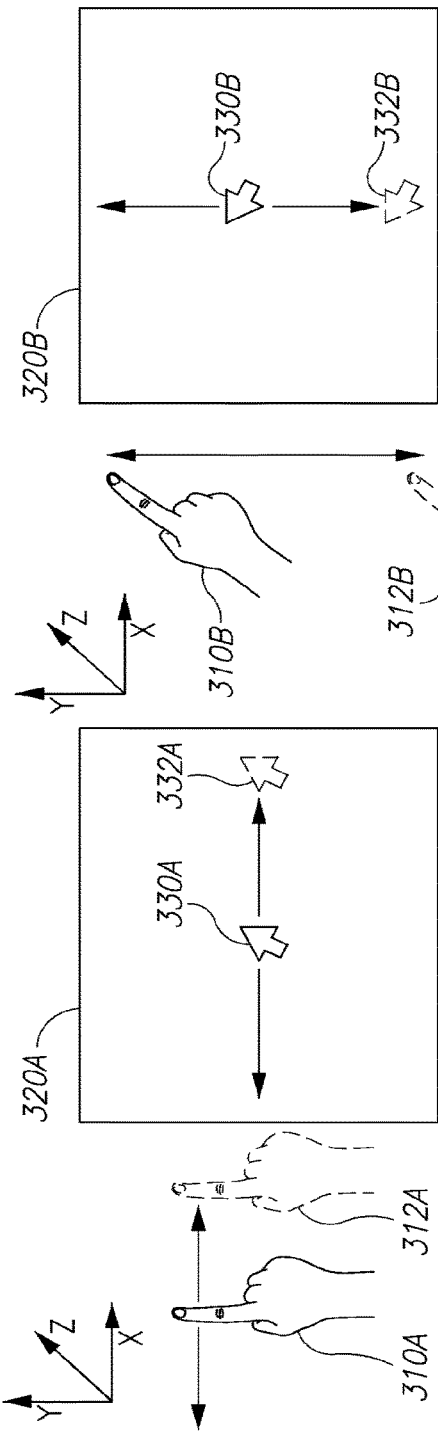

CONTROLLING A NEAR EYE DISPLAY

CROSS-REFERENCE TO RELATED APPLICATIONS

This application claims benefit from U.S. Provisional Patent Application No. 61/863,510, filed on Aug. 8, 2013, which is incorporated herein by reference in its entirety.

FIELD OF THE INVENTION

The present invention relates generally to the field of gesture recognition, and more specifically, using same for near eye display applications.

BACKGROUND OF THE INVENTION

Prior to the background of the invention being set forth, it may be helpful to set forth definitions of certain terms that will be used hereinafter.

The term 'near eye display' as used herein is defined as devices which include augmented reality or virtual reality glasses and wearable projected displays.

The term 'field of view' as used herein is defined as the extent of the observable world that is seen at any given moment by a user or a sensor.

The term 'Augmented Reality' (AR) as used herein is defined as a live direct or indirect view of a physical, real-world environment whose elements are augmented (or supplemented) by computer-generated sensory input such as sound, video, graphics or any other data.

The term 'Virtual Reality' (VR) as used herein is defined as a computer-simulated environment that can simulate physical presence in places in the real world or imagined worlds. Virtual reality could recreate sensory experiences, including virtual taste, sight, smell, sound, touch, and the like.

Many devices use wearable displays for presenting information in front of the user in everyday activities. An example of such a device is the augmented reality (AR) glasses which positions a screen in front of the user's eye to display an additional layer of information and content. Although the information displayed is diverse and may hold various content categories and flexible graphical user interface, there is no convenient and flexible way for controlling the content displayed.

Another aspect that restricts the functional ability to control the presented content is that it is displayed directly to the user's eye. In this case, actual touch interfaces are not an option for control, creating a need for separating the actual controlling area from the display while maintaining the extended abilities of touch control.

In addition, portable devices, such as near-eye display devices are limited in terms of the acceptable power consumption and weight allowed for the device components. Therefore, using available gestures capturing technologies, based on an IR illumination source and an additional IR sensor is not practical due to the incremental weight and power consumption.

SUMMARY OF THE INVENTION

Some embodiments of the present invention overcome the challenges of the prior art by, inter alia, using existing components of a near-eye device such as the frontal camera with a visible light structured pattern which enables to reduce the additional hardware needed to be embedded into the device as well as limiting the incremental power consumption.

Some embodiments of the present invention include a transmitter module designed for projecting structured light pattern onto a virtual navigation space, a camera module positioned and oriented for capturing the structured light data, a processor defined for calculating three dimensional data and detecting the user's controlling gestures, and a display system for displaying information relating to the position of the fingertip and performed gestures.

These additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

FIG. 3A is a diagram illustrating a non-limiting gesture and its outcome in accordance with some embodiments of the present invention;

FIG. 3B is a diagram illustrating another non-limiting gesture and its outcome in accordance with some embodiments of the present invention;

FIG. 3C is a diagram illustrating yet another non-limiting gesture and its outcome in accordance with some embodiments of the present invention;

FIG. 3D is a diagram illustrating yet another non-limiting gesture and its outcome in accordance with some embodiments of the present invention;

DETAILED DESCRIPTION OF THE INVENTION

Figure 1:
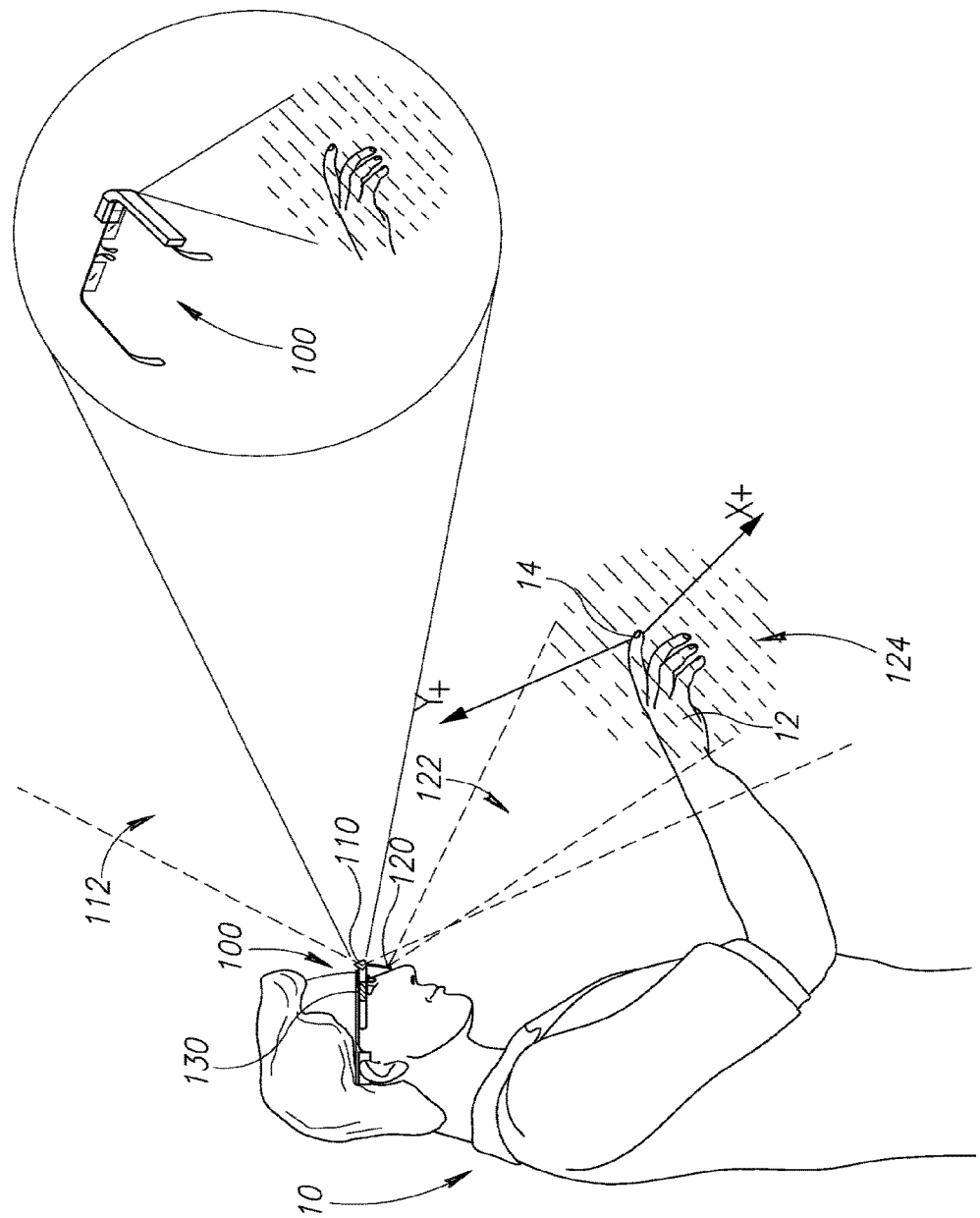
FIG. 1 illustrates the device and its environment according to some embodiments of the present invention.

With specific reference now to the drawings in detail, it is stressed that the particulars shown are by way of example and for purposes of illustrative discussion of the preferred embodiments of the present technique only, and are presented in the cause of providing what is believed to be the most useful and readily understood description of the principles and conceptual aspects of the present technique. In this regard, no attempt is made to show structural details of the present technique in more detail than is necessary for a fundamental understanding of the present technique, the description taken with the drawings making apparent to those skilled in the art how the several forms of the invention may be embodied in practice.

Before at least one embodiment of the present technique is explained in detail, it is to be understood that the invention is not limited in its application to the details of construction and the arrangement of the components set forth in the following description or illustrated in the drawings. The present technique is applicable to other embodiments or of being practiced or carried out in various ways. Also, it is to be understood that the phraseology and terminology employed herein is for the purpose of description and should not be regarded as limiting.

Some embodiments of the present invention address the challenge of controlling a cursor or any other added content presented to a user wearing a near eye display. In other words, any computer generated content that is super positioned over the captured scene, to yield an augmented reality or VR may be controlled by gestured and postures of the viewer, using embodiments of the present invention.

FIG. 1 illustrates the device according to some embodiments of the present invention in operation within its working environment. The device may be implemented as a wearable near eye display 100 which directly projects an image onto the eyes of a user 10. The device may include a sensor 110 (e.g., a camera) having a specified field of view 112, attached to the wearable near eye display 100 and configured to capture a scene at the specified field of view overlapping a field of view 122 of the user 10. As can be seen in the inset, device 100 may take the form of eye glasses 130 with some projector and image source coupled to the visor.

The device may further include a transmitter 120 attached to the wearable near eye display. Transmitter 120 may be configured to transmit a specified light pattern onto a navigation space 124, wherein the sensor 110 is configured to capture reflections of the specified pattern coming from the navigation space 124. The source of light may a laser diode, a light emitting diode (LED), any another element which emits a light beam, as known in the art.

The light beam emitted by transmitter 120 propagates through a micro structured element (not shown), onto the navigation space. The micro structured element modifies the light beam, for generating the light pattern projected onto the navigation space.

Optionally, the micro structured element converts the light beam into a light beam of a variable cross sectional intensity profile. Consequently, the cross sectional intensity profile varies along the light beam, thus providing information indicative of a distance of an object (say one of the user's digits) from the source of light.

Optionally, the transmitter 120 projects a light pattern having a continuous feature in a first direction and a non-continuous feature in a direction substantially perpendicular to the first direction, onto the navigation space. Optionally, the micro structured element is a diffractive optical element, as known in the art.

The diffractive optical element may be obtained by a periodic micro structure that splits the light beam into a discrete number of spots having a one dimensional or a two dimensional spatial arrangement, as known in the art. Optionally, an additional element such as a cylindrical micro lens array or an additional diffractive element is used to create a stripe from each of the spots.

Optionally, the stripe is marked with phase notations positioned in fixed distances from each other, along the stripe.

A possible advantage of using an additional microstructure element such as a cylindrical micro lens array is that the additional element may disperse a zero order of a light beam such as a laser beam, as known in the art. The zero order is a center of a light spot output from the diffractive element, and may be characterized by relatively high energy. Dispersing the zero order to a light structure such as the stripe, may allow increasing intensity of a laser light beam without crossing eye safety limits.

Optionally, transmitter 120 further includes an additional diffractive element, which changes the cross-sectional intensity profile of each stripe in the light pattern with respect to the distance from an object which reflects the projected stripe. The cross-sectional intensity profile is an intensity profile perpendicular to the propagation direction of the light projected.

Optionally, the intensity profile change is a gradual change from a Gaussian cross-sectional intensity profile to a Top Hat cross-sectional intensity profile, carried out gradually along a distance traversed by the projected light, as the projected light propagates to an object, and is reflected back from surface of the object.

Optionally, the intensity profile change is a gradual change from an intensity profile with a single peak to an intensity profile with two or more peaks, etc., as known in the art.

The change in the intensity profile, a long distance traversed by light reflected from an object projected by the light with the light pattern, may help differentiate between stripes reflected from different objects, in different ranges, and thus further helps overcome a segment unification problem.

Further, the change in the intensity profile may further be used to directly measure distance to the controllable object (e.g., to the user's hand, fingers and thumb). Sensor 110 may be a video camera such as a webcam or a cellular phone's camera, positioned next to transmitter 120.

Figure 2B:
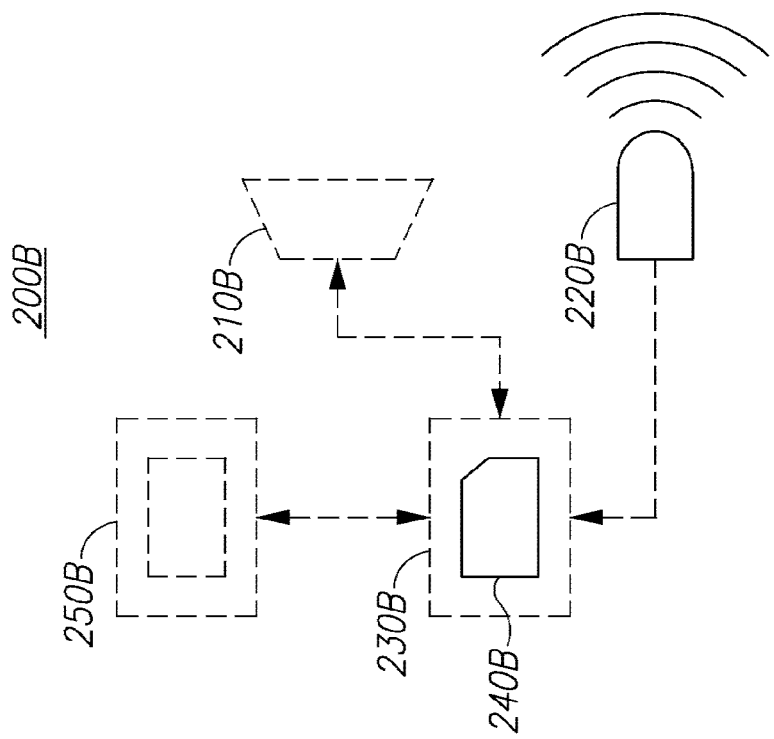
FIG. 2B is a block diagram illustrating the device in accordance with another embodiment of the present invention.
Figure 2A:
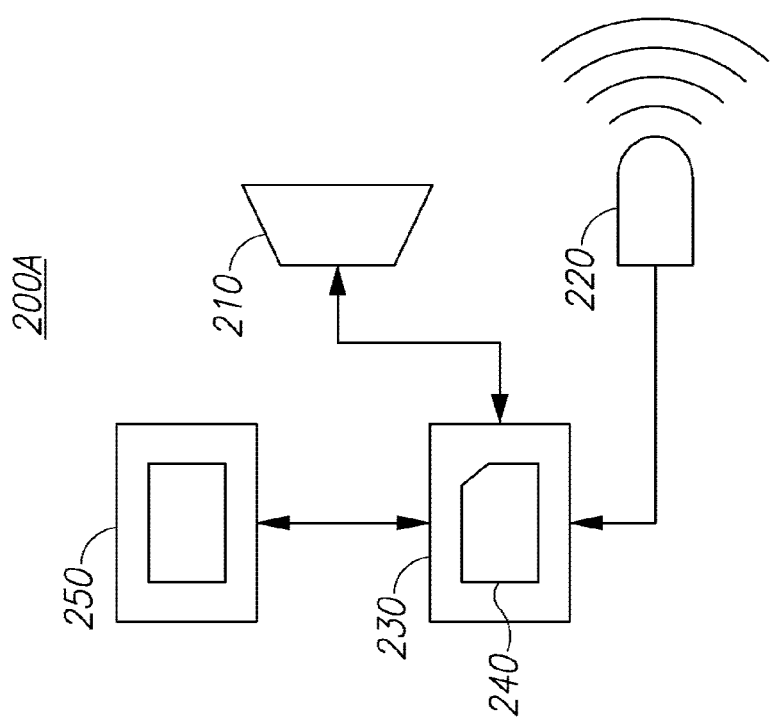
FIG. 2A is a block diagram illustrating the device in accordance with one embodiment of the present invention.

FIG. 2A is a block diagram illustrating the device 200A in accordance with one embodiment of the present invention. Device 200A may include a wearable near eye display 250, a sensor 210 attached to the wearable near eye display and configured to capture a scene. Device 200A may further include a transmitter 220 attached to the wearable near eye display 250. As explained in detail above the transmitter 220 is configured to transmit a structured light pattern onto a navigation space, wherein sensor 210 may further be configured to capture reflections of the specified pattern coming from the navigation space. Device 200A may further include a computer processor 230 configured to analyze the reflections and control a visual indicator (not shown here) presented to a user over the wearable near eye display 250, based on the analysis. Device 200A may take the form of eye glasses of any head mounted display as depicted in the inset of FIG. 1.

FIG. 2B is a block diagram illustrating the device in accordance with another embodiment of the present invention. Here the device 200B is provided in an add-on or retrofit configuration and apart from the transmitter 220B and a software application 240B, all other elements are provided as a workpiece or an environment. The system may thus include a transmitter 220B attachable to a near eye display 250B, a computer readable code 240B executable on a computer processor 230B and configured, when executed, to invoke the computer processor 230B to: instruct the transmitter to transmit a structured light pattern onto a navigation space, instruct a sensor attached to the wearable near eye display to capture a scene; instruct said sensor to capture reflections of the specified pattern coming from the navigation space; and analyze the reflections and control a visual indicator presented to a user over the wearable near eye display 250B, based on the analysis.

As in other structured light techniques known in the art, the analysis carried out by the computer processor may be achieved by generating 3D depth map based on the reflections of the patterned light coming from the navigational space and further analyzing the 3D depth map.

The structured light pattern is projected onto the virtual navigation area creating a volume where objects can be detected in 3D. The structured light may consist of dots pattern, Lines, curves or any other pattern that enable the ability of 3D depth mapping or object segmentation. Once an object is detected inside the detection volume and is activated as a controlling object, further properties are calculated in regards to the object position, orientation, shape, etc. These properties are then further processed to create interface events and to control a visual feedback of a pointing indication on the user interface of the device. The gestures event can be triggered by the control object's movement, position or a specific shape created by the object.

According to some embodiments of the present invention, the virtual navigation area 124 covers only part of the camera field of view 112. Such part may consist of the lower part of the camera image while the majority of the camera field of view is kept free from projected light. In this way, the needed laser or LED power consumption that produces the structured light is reduced significantly. In addition, there is minor interference between the projected pattern and the standard usage of the device camera in that case. In order to project the structured light pattern on the edge of the camera field of view, an angle between the transmitter optical axis and the camera optical axis is presented. The effect of such an angle is encapsulated in the method of the depth extraction and the object segmentation. In addition, the transmitter can be positioned with a shift backwards on the line of the camera optical axis in relation with the sensor (camera) field of view direction. This enables additional flexibility in the device design and is taken into account in the pattern analysis method as well.

According to some embodiments of the present invention, the structured light pattern is projected using a light source in the visible spectral range. This gives the ability to use the existing frontal camera of the wearable device without removing the IR-cut filter that is standard for such camera. The quantum efficiency of the CMOS sensor enables better sensitivity in the visible spectral range reducing the energy needed for the structured light transmitter. Another important advantage of using visible light is that the control object becomes highlighted with the reflected light when entering the virtual navigation space. This indicates to the user on where to position his hand/finger in order to be within the borders of the navigation space.

According to some embodiments of the present invention, the structured light is focused to a specific distance from transmitter 120 utilizing a short depth of focus around that distance. This creates a limited region along the optical axis of the transmitter. Only inside that region the light pattern structure is detectable by the camera. Although it limits the space where the user can operate in, it also blurs the light pattern outside of that region and reduces the unwanted s reflection from objects in the scene in front of the user.

According to some embodiments of the present invention, the structured light pattern may consist of light features that are continues in one direction and non-continues in another direction. These features are used to enable segmentation of the control object from the background scenario and for detecting the contour of the object. In addition, various intensities may appear on different light feature creating a unique intensity signature between each sub group of the line features in the pattern. This enables detecting the index of each line feature precisely and determining the accurate depth of the object that reflects the pattern back to the camera. In another aspect, the light features may consist of notations, variation of intensity, or other feature alternation along the light feature itself to assist the segmentation of the control object as well as locally detect its depth.

FIG. 3A is a diagram illustrating a non-limiting gesture and its outcome in accordance with some embodiments of the present invention. Responsive to moving the hand from position 310A to position 312A along an X axis at the navigation space, the cursor is moving along a corresponding X' axis from position 330A to position 332A over display 320A. It is understood, however, that, for practical reasons, a similar displacement of the finger only of the hand from one position to another leads to a displacement of the cursor (visual indicator) at the display.

In general, the computer processor of the device is configured to map or translate one form of movement in real life (of the controlling object) at the x-y-z space into another movement at the display. Similar mappings are illustrated in FIGS. 3B-3D where in 3B Y axis mapping is demonstrated with positions 310B and 312B in real life correspond to positions 330B and 332B of the cursor over display 320B. Alternatively, the mapping may convert movement along a Y axis at the navigational space into a movement along a corresponding Z axis at the display, in accordance with the requirements of the application.

In FIGS. 3C and 3D, tilting the palm of the hand, a fist or at least one finger along a predefined arc (e.g., tilting or applying an angular displacement or movement from position 310C towards right in position 312C or from position 310D towards up in position 312D) causes moving the cursor in the display 320C (e.g., from 330C to 332C or from 330D to 332D), in a gesture that may resemble controlling a joystick.

One of the key features of some embodiments of the present invention is the ability to separate the pointing direction of the controlling object and the position of the displayed graphics relating the user's perspective, including the pointing indication on the device display. This enables, besides the previously mentioned advantages of reducing the size of the navigation space, also some key controlling schemes. One of these schemes includes scaling or normalizing the position of the controlling device to enable larger or smaller movements to cover the entire graphical area presented to the user. In this way, the actual size of the virtual navigation space is not depended on the size and location of the presented object and can be determined based on the use case and user experience.

In another aspect, the angle and orientation of the controlling object is used as an input to determine the position of the graphical pointing indication on the presented UI. For example, an angle created between the controlling object and the horizontal axis in relation to the transmitter optical axis can be translated to a position on the x-axis of the presented user interface. An angle created between the controlling object and the vertical axis in relation to the transmitter optical axis can be translated to a position on the y-axis of the presented interface.

In another aspect of the invention, selecting gestures are presented. A selecting gesture may include one of the following postures: an addition of a controlling object to the virtual navigation space. Such controlling object may be an additional finger. The additional controlling object may be attached to the first controlling object previously located in the virtual navigation space. Another presented selecting gesture includes the rotation of the controlling object. For example, in the case that the controlling object is a hand with a stretched pointing finger, rotating the hand around the finger axis or pushing the finger forward will result in a click event. This enables clicks without changing the apposition and orientation of the controlling object therefore enable stable pointing during the click action.

According to some embodiments, the sensor and the transmitter are operable only within visible light bandwidth. This way the pattern may also be used as visual feedback to the user—indicating that his or her hand is within the navigational space.

According to some embodiments, the sensor configured to capture the scene and the reflections is a single element. By configuring a single sensor to do both tasks, a more cost effective and low power consumption device may be achieved.

According to some embodiments, the control of the visual indicator comprises moving the visual indicator along a first axis of the display responsive to moving the controlling object along a second axis of the navigation space.

According to some embodiments, the computer processor is further configured to identify, based on the reflections analysis at least one predefined action gesture, and invoke a corresponding action event associated with the visual indicator and content presented over the wearable near eye display.

According to some embodiments, the navigational space is located at a lower side of the field of view. This way it does not obstruct the viewpoint of the user.

According to some embodiments, the navigational space is limited in depth by a depth of field of the transmitter, for a depth in which the specified pattern is in focus.

Figure 4:
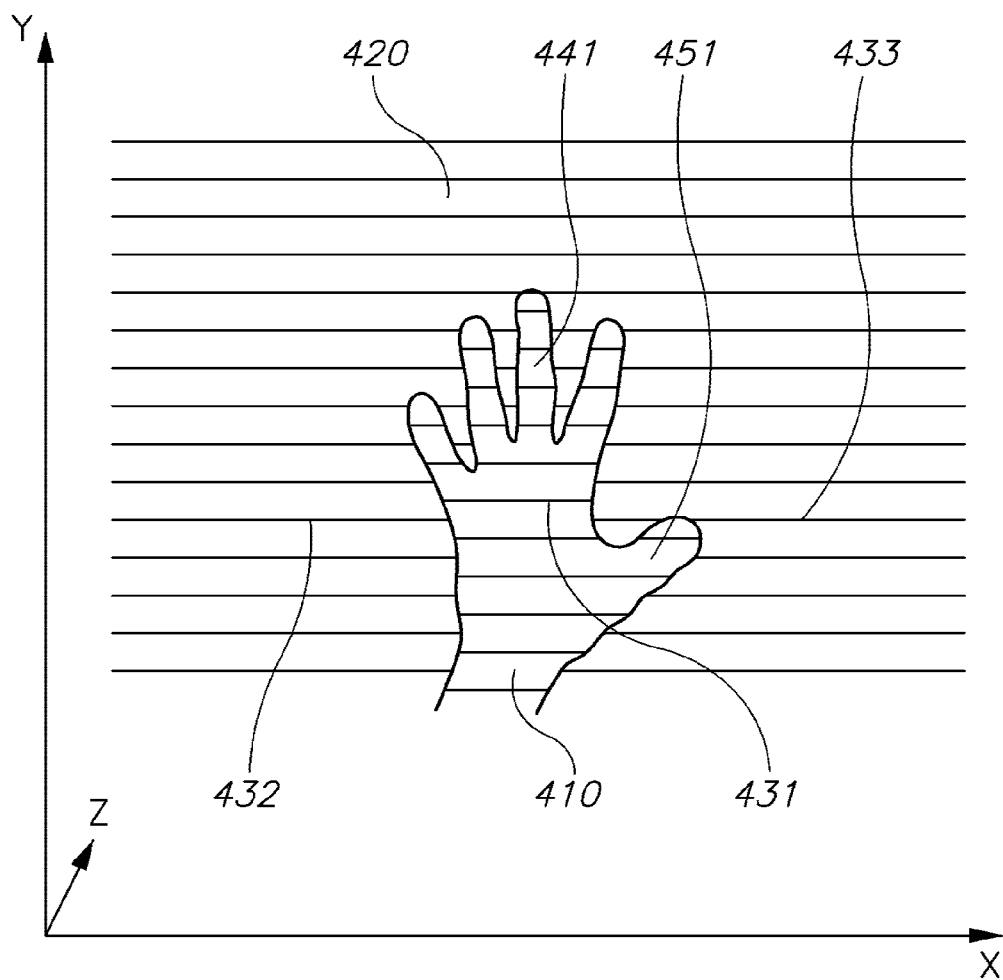
FIG. 4 is a diagram illustrating a non-limiting pattern projected onto a hand of a user serving as a controlling object in accordance with some embodiments of the present invention.

FIG. 4 is a schematic diagram 400 illustrating a hand projected with a light pattern, according to an exemplary embodiment of the present invention. According to an exemplary embodiment, the tracking of the movement of the hand is carried out, using a light pattern designed to enable detection of hand movement, such as fine movements of fingers and thumbs. The use of structured light may be, for instance, as disclosed in WIPO PCT Patent Application Publication No. WO 2013/088442, which is incorporated herein by reference in its entirety.

The specifically designed light pattern allows the tracking of the movement, even in bi-dimensional video data, which unlike three dimensional depth map, does not provide for easy separation of the hands from the rest of the body.

Optionally, the light pattern may be specifically designed to track movement of the hand's digits in a bi-dimensional video data (e.g., video images streamed from a regular video camera). More specifically, the light pattern may be designed to enable detection and tracking of digits (i.e., fingers and thumb) as well as palm, in the bi-dimensional video data, according to distortions of the pattern by the digits.

Optionally, the light pattern has a continuous feature in a first direction (say the X-axis) and a non-continuous (say periodic) feature in a direction substantially perpendicular to the first direction (say the Y-axis). In one example for such a pattern, the light pattern includes several stripes arranged in parallel (or in near parallel) to each other, as shown in diagram 400.

A sensor that may be positioned in a certain Y-axis distance, near a transmitter which projects the stripes pattern on the hand 410 and on the background 420 (say a surface of a table the hand rests on, a wall, etc.). The position of the sensor is selected, so as to create a triangulation effect between the camera, the light projector and the light reflected back from the user's hand 410 and the background 420, as known in the art. The triangulation effect causes discontinuities in the pattern at the points along a stripe where there are significant depth shifts from an object projected with a light pattern. The discontinuities segment (i.e., divide) the stripe into two or more stripe segments, say a segment 431 positioned on the hand, a segment 432 position to the left of the hand and a segment 433 position to the right of the hand.

Such depth shift generated stripe segments may be located on the contours of the user's hand's palm or digits, which are positioned between the camera and the user's body. That is to say that the user's digit or palm segments the stripe into two or more stripe segments. Once such a stripe segment is detected, it is easy to follow the stripe segment, to the stripe segment's ends.

The device may thus analyze bi-dimensional video data, to generate clusters of stripe segments. For example, the device may identify in the light pattern, a cluster of one or more stripe segments created by segmentation of stripes by a digit of the hand, say a cluster 441 of four segments reflected from the hand's central finger. Consequently, the device tracks the movement of the digit, by tracking the cluster of stripe segments created by segmentation of stripes by the digit, or by tracking at least one of the cluster's segments.

The cluster of stripe segments created by segmentation (i.e., division) of stripes by the digit includes strip segments with an overlap in the X axis. Optionally, the stripe segments in the cluster further have similar lengths (derived from the fingers thickness) or relative proximity in the Y-axis coordinates.

On the X-axis, the segments may have a full overlap for a digit positioned straightly, or a partial overlap for a digit positioned diagonally in the X-Y plane. Optionally, the device further identifies a depth movement of the digit, say by detecting a change in the number of segments in the tracked cluster. For example, if the user stretches the user's central digit, the angle between the digit and the plane of the light projector and camera (X-Y plane) changes. Consequently, the number of segments in the cluster 441 is reduced from four to three.

Optionally, the device further identifies in the light pattern, one or more clusters of one or more stripe segments created by segmentation of stripes by a palm of the hand.

The cluster of stripe segments created by segmentation of stripes by the palm includes an upper strip segment 431 which overlaps with the user hand's fingers stripe segment clusters, in the X axis. The upper strip segment 431 overlaps the four finger clusters in the X-axis, but do not exceed beyond the minimum and maximum X value of the four finger clusters' bottom segments.

The cluster of stripe segments created by segmentation of stripes by the palm further includes, just below segment 431, a few strip segments in significant overlap with the strip segment 431. The cluster of stripe segments created by segmentation of stripes by the palm further includes longer stripe segments that extend to the base of a stripe segment cluster 451 of the user's thumb. It is understood that the digit and palm cluster's orientation may differ with specific hands positions and rotation.

Figure 5:
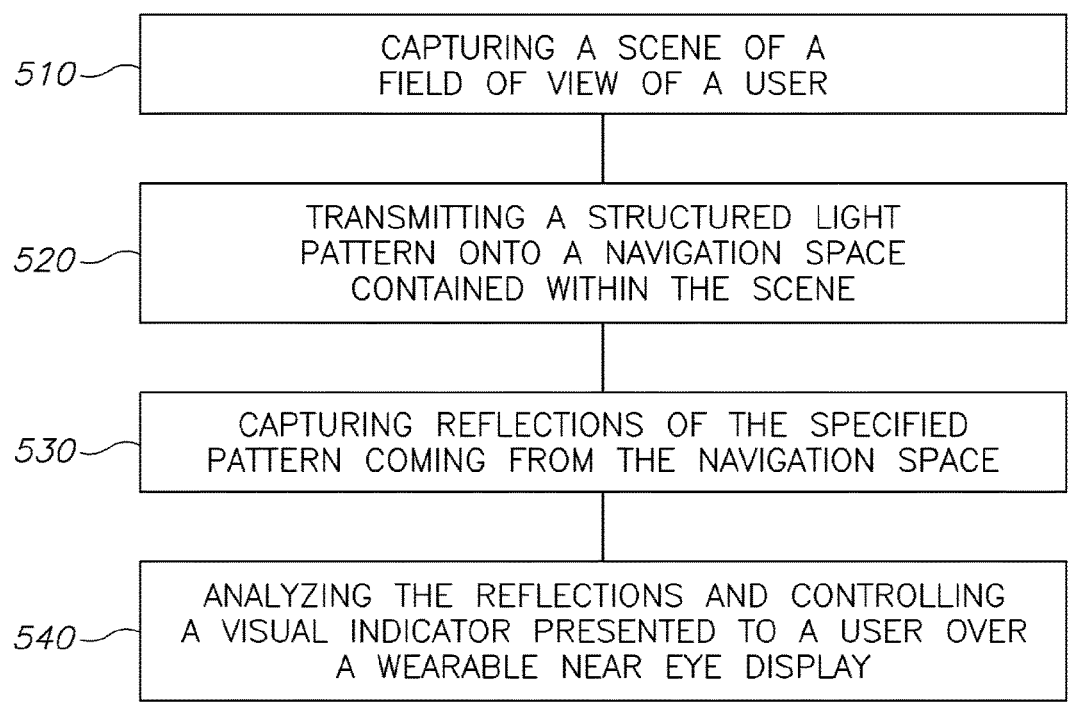
FIG. 5 is a flowchart illustrating a method according to some embodiments of the present invention.

FIG. 5 is a flowchart 500 illustrating a high level process for implementing embodiments of the present invention. It is noted that flowchart 500 is not limited to the aforementioned architecture of device 100. The method may include: capturing a scene of a field of view of a user 510; transmitting a structured light pattern onto a navigation space contained within said scene 520; capturing reflections of the specified pattern coming from the navigation space 530; and analyzing said reflections and control a visual indicator presented to a user over a wearable near eye display 540.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. An apparatus comprising:
    a wearable near eye display;
    a sensor attached to the wearable near eye display and configured to capture a scene;
    a transmitter attached to the wearable near eye display, wherein the transmitter is configured to transmit a structured light pattern onto a navigation space and onto a hand of a user in the navigation space, and wherein the sensor is further configured to capture reflections of the structured light pattern coming from the navigation space; and
    a computer processor configured to
        analyze the reflections of the structured light pattern coming from the navigation space;
        identify a gesture of the hand from a set of predefined gestures based on the reflections analysis, each gesture in the set of predefined gestures comprising a rotation or a posture change of the hand in the navigation space;
        control a cursor presented to the user over the wearable near eye display according to the identified gesture of the hand, the cursor being a graphical pointing indication on the wearable near eye display interacting with content presented over the wearable near eye display;
        invoke a corresponding action associated with the cursor over the wearable near eye display based on the identified gesture of the hand; and
        move the cursor along an axis at the wearable near eye display based on the rotation of the hand along the axis at the navigation space, the hand remaining in a form of a first during the rotation.

2. The apparatus of claim 1, wherein the computer processor is further configured to instruct the wearable near eye display to present a computer generated scene to the user providing a virtual reality environment to the user.

3. The apparatus of claim 1, wherein the computer processor is further configured to instruct the wearable near eye display to present the captured scene to the user providing an augmented reality environment to the user.

4. The apparatus of claim 1, wherein the computer processor is further configured to generate a 3D depth map based on the reflections and to analyze the 3D depth map.

5. The apparatus of claim 1, wherein the computer processor is further configured to instruct the transmitter to illuminate only a portion of the navigation space comprising the hand.

6. The apparatus of claim 1, wherein the computer processor is further configured to present, over the wearable near eye display, a computer generated scene with which the cursor interacts.

7. The apparatus of claim 1, wherein the sensor and the transmitter are operable only within visible light bandwidth.

8. The apparatus of claim 1, wherein the sensor that captures the scene and the sensor that captures the reflections is a single element.

9. The apparatus of claim 1, wherein
the computer processor is further configured to move the cursor along one axis at the wearable near eye display based on the posture change of a finger of the hand along a defined axis at the navigation space.

10. The apparatus of claim 1, wherein the computer processor is further configured to move the cursor along the axis at the wearable near eye display based on tilting a palm of the hand along a specified arc at the navigation space.

11. The apparatus of claim 1, wherein a depth of field of the structured light pattern is selected to match a predefined location of the navigation space.

12. The apparatus of claim 1, wherein the structured light pattern is continuous along a first axis and non-continuous along a second axis perpendicular to the first axis.

13. The apparatus of claim 1, wherein the structured light pattern covers less than 10% of a field of view of the sensor.

14. A system comprising:
a transmitter attachable to a wearable near eye display;
a computer readable code executable on a computer processor and configured, when executed, to invoke the computer processor to:
instruct the transmitter to transmit a structured light pattern onto a navigation space and onto a hand of a user in the navigation space;
instruct a sensor attached to the wearable near eye display to capture a scene;
instruct the sensor to capture reflections of the structured light pattern coming from the navigation space;
analyze the reflections of the structured light pattern coming from the navigation space;
identify a gesture of the hand from a set of predefined gestures based on the reflections analysis, each gesture in the set of predefined gestures comprising a rotation or a posture change of the hand in the navigation space;
control a cursor presented to the user over the wearable near eye display according to the identified gesture of the hand, the cursor being a graphical pointing indication on the wearable near eye display interacting with content presented over the wearable near eye display;
invoke a corresponding action associated with the cursor over the wearable near eye display based on the identified gesture of the hand; and
move the cursor along an axis at the wearable near eye display based on the rotation of the hand along the axis at the navigation space, the hand remaining in a form of a first during the rotation.

15. A method comprising:
capturing a scene from a view point of a user;
transmitting a structured light pattern from the view point onto a navigation space and onto a hand of the user in the navigation space;
capturing reflections of the structured light pattern coming from the navigation space;
analyzing the reflections of the structured light pattern coming from the navigation space;
identifying a gesture of the hand from a set of predefined gestures based on the reflections analysis, each gesture in the set of predefined gestures comprising a rotation or a posture change of the hand in the navigation space;
controlling a cursor presented to the user over the wearable near eye display according to the identified gesture of the hand, the cursor being a graphical pointing indication on the wearable near eye display interacting with content presented over the wearable near eye display;
invoking a corresponding action associated with the cursor over the wearable near eye display based on the identified gesture of the hand; and
moving the cursor along an axis at the wearable near eye display based on the rotation of the hand along the axis at the navigation space, the hand remaining in a form of a first during the rotation.

16. The method of claim 15, further comprising instructing the wearable near eye display to present a computer generated scene to the user providing a virtual reality environment to the user.

17. The method of claim 15, further comprising instructing the wearable near eye display to present the captured scene to the user providing an augmented reality environment to the user.

18. The method of claim 15, wherein analyzing the reflections comprises generating a 3D depth map based on the reflections and analyzing the 3D depth map.

19. The method of claim 15, further comprising illuminating with the structured light pattern only a portion of the navigation space comprising the hand.

20. The method of claim 15, further comprising presenting over the wearable near eye display, a computer generated scene with which the cursor interacts.

21. The method of claim 15, further comprising moving the cursor along one axis at the wearable near eye display based on the posture change of a finger of the hand along a defined axis at the navigation space.

22. The method of claim 15, further comprising moving the cursor along the axis at the wearable near eye display based on tilting a palm of the hand along a specified arc at the navigation space.

23. The apparatus of claim 1, wherein the computer processor is further configured to identify the gesture of the hand from the set of predefined gestures by detecting segmentation of the structured light pattern reflected from the hand and captured by the sensor.

24. The apparatus of claim 1, wherein the computer processor is further configured to:
generate a 3D depth map of the navigation space based on the reflections of the structured light pattern captured by the sensor; and
analyze segmentation in the 3D depth map of the navigation space to identify the gesture of the hand from the set of predefined gestures.

25. The method of claim 15, further comprising identifying the gesture of the hand from the set of predefined gestures by detecting segmentation of the structured light pattern reflected from the hand.

26. The method of claim 15, further comprising:
generating a 3D depth map of the navigation space based on the captured reflections of the structured light pattern; and
analyzing segmentation in the 3D depth map of the navigation space to identify the gesture of the hand from the set of predefined gestures.

* * * * *

UNITED STATES PATENT AND TRADEMARK OFFICE
CERTIFICATE OF CORRECTION

PATENT NO. : 10,019,843 B2
APPLICATION NO. : 14/453733
DATED : July 10, 2018
INVENTOR(S) : Nadav Grossinger et al.

Page 1 of 1

It is certified that error appears in the above-identified patent and that said Letters Patent is hereby corrected as shown below:

In the Claims

Column 10, Claim 1, Line 26, after "to", insert --:--

Column 10, Claim 1, Line 46, delete "first" and insert --fist--

Column 11, Claim 9, Line 4, after "wherein", delete "¶"

Column 11, Claim 14, Line 52, delete "first" and insert --fist--

Column 12, Claim 15, Line 13, delete "first" and insert --fist--

Signed and Sealed this
Thirtieth Day of April, 2019

Andrei Iancu
*Director of the United States Patent and Trademark Office*